US012718736B2

(12) United States Patent
Lim et al.

(10) Patent No.: US 12,718,736 B2
(45) Date of Patent: Aug. 25, 2026

(54) GATE DRIVER CIRCUIT AND DISPLAY PANEL

(71) Applicant: TCL CHINA STAR OPTOELECTRONICS TECHNOLOGY CO., LTD., Shenzhen (CN)

(72) Inventors: Donghun Lim, Shenzhen (CN); Xiaolin Zhang, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 19/186,572

(22) Filed: Apr. 22, 2025

(65) Prior Publication Data

US 2026/0188171 A1 Jul. 2, 2026

(30) Foreign Application Priority Data

Dec. 31, 2024 (CN) ........................ 202411999522.7

(51) Int. Cl.
*G09G 3/20* (2006.01)

(52) U.S. Cl.
CPC ... *G09G 3/2092* (2013.01); *G09G 2310/0267* (2013.01); *G09G 2310/061* (2013.01)

(58) Field of Classification Search
CPC ......... G09G 3/2092; G09G 2310/0267; G09G 2310/061
See application file for complete search history.

(56) References Cited

U.S. PATENT DOCUMENTS 10,347,189 B2 * 7/2019 Bae ...................... G11C 19/287
10,665,187 B2 * 5/2020 Chen .................... G09G 3/3648
(Continued)

FOREIGN PATENT DOCUMENTS

CN 104299591 A 1/2015
CN 106205538 A 12/2016
(Continued)

OTHER PUBLICATIONS

Chinese Office Action issued in corresponding Chinese Patent Application No. 202411999522.7 dated Sep. 18, 2025, pp. 1-10.

*Primary Examiner* — Benyam Ketema
(74) *Attorney, Agent, or Firm* — PV IP PC; Peter Stecher; Wei Te Chung

(57) ABSTRACT

A gate driver circuit and a display panel are provided. The gate driver circuit includes a plurality of gate driver units in a cascaded configuration, and each of the gate driver units includes a pull-down maintenance module, which is electrically connected to a first node and configured to receive a first low-level signal, a second low-level signal, a first control signal, and a second control signal; the pull-down maintenance module includes a first inverter including a first inverted output terminal, a second inverter including a second inverted output terminal, and a voltage stabilization submodule; and the voltage stabilization submodule is configured to maintain a low potential of the second inverted output terminal in response to a high potential of the first control signal, and maintain a low potential of the first inverted output terminal in response to a high potential of the second control signal.

20 Claims, 3 Drawing Sheets

(56) References Cited

U.S. PATENT DOCUMENTS

| | | | | |
|---|---|---|---|---|
| 10,950,155 | B1 * | 3/2021 | Xue | G09G 3/20 |
| 11,074,884 | B1 * | 7/2021 | Wang | G09G 3/3677 |
| 11,361,725 | B2 * | 6/2022 | Zhu | G09G 3/3677 |
| 11,380,277 | B2 * | 7/2022 | Xi | G11C 19/28 |
| 12,067,916 | B2 * | 8/2024 | Zhou | G09G 3/20 |
| 12,190,780 | B2 * | 1/2025 | Feng | G09G 3/3677 |
| 12,451,045 | B2 * | 10/2025 | Lv | G09G 3/3677 |
| 12,482,400 | B2 * | 11/2025 | Jiang | G09G 3/3677 |
| 2009/0010379 | A1 * | 1/2009 | Chiang | G11C 19/28 377/64 |
| 2016/0140928 | A1 * | 5/2016 | Xiao | G09G 3/3674 345/212 |
| 2016/0189649 | A1 * | 6/2016 | Xiao | G11C 19/28 345/87 |
| 2016/0275886 | A1 * | 9/2016 | Dai | G11C 19/184 |
| 2018/0190223 | A1 * | 7/2018 | Zeng | G09G 3/3677 |
| 2018/0268768 | A1 * | 9/2018 | Lv | G02F 1/1368 |
| 2020/0035180 | A1 * | 1/2020 | Chen | G09G 3/3677 |
| 2020/0410941 | A1 * | 12/2020 | Park | G09G 3/3674 |
| 2021/0264868 | A1 * | 8/2021 | Zhao | G09G 3/3677 |
| 2021/0280147 | A1 * | 9/2021 | Xi | G11C 19/28 |
| 2021/0335206 | A1 * | 10/2021 | Quan | G09G 3/2092 |
| 2021/0335310 | A1 * | 10/2021 | Zhu | G09G 3/3677 |
| 2022/0051598 | A1 * | 2/2022 | Xue | G09G 3/20 |
| 2022/0122559 | A1 * | 4/2022 | Lv | G09G 3/3677 |
| 2022/0238080 | A1 * | 7/2022 | Xi | G09G 3/3677 |
| 2022/0309975 | A1 * | 9/2022 | Lv | G09G 3/20 |
| 2023/0075449 | A1 * | 3/2023 | Ji | G09G 3/3266 |
| 2023/0116413 | A1 * | 4/2023 | Zhu | G09G 3/20 345/204 |

FOREIGN PATENT DOCUMENTS

| | | | |
|---|---|---|---|
| CN | 117666838 | A | 3/2024 |
| CN | 118938548 | A | 11/2024 |

* cited by examiner

GATE DRIVER CIRCUIT AND DISPLAY PANEL

CROSS-REFERENCE TO RELATED APPLICATION

This application claims priority to and the benefit of Chinese Patent Application No. 202411999522.7, filed on Dec. 31, 2024, the disclosure of which is incorporated herein by reference in its entirety.

TECHNICAL FIELD

The present disclosure relates to the field of display, and in particular, to a gate driver circuit and a display panel.

BACKGROUND

In related art, in order to output square wave pulse signals that can control the turn-on and turn-off of thin film transistors for pixels row by row, a gate driver circuit is generally equipped with a pull-up control unit, a pull-up unit, a pull-down unit, a pull-down maintenance unit, and a reset unit, and the pull-down maintenance unit can maintain the stability of voltages at key nodes.

However, there may be uncontrollable problems at some circuit nodes in the pull-down maintenance unit, resulting in poor stability of output signals of the gate driver circuit and an uncontrollable lifetime of the gate driver circuit.

SUMMARY

In a first aspect, some embodiments of the present disclosure provide a gate driver circuit, which includes a plurality of gate driver units in a cascaded configuration, and each of the gate driver units includes:

- a pull-down maintenance module electrically connected to a first node, where the pull-down maintenance module is configured to receive a first low-level signal, a second low-level signal, a first control signal, and a second control signal, and is configured to maintain a low potential of the first node in response to the first low-level signal and the second low-level signal, where the pull-down maintenance module includes:
- a first inverter including a first inverted output terminal and configured to access the first control signal;
- a second inverter including a second inverted output terminal and configured to access the second control signal; and
- a voltage stabilization submodule electrically connected to the first inverter and the second inverter, where the voltage stabilization submodule is configured to maintain a low potential of the second inverted output terminal in response to a high potential of the first control signal, and is configured to maintain a low potential of the first inverted output terminal in response to a high potential of the second control signal.

In a second aspect, some embodiments of the present disclosure provide a display panel including the gate driver circuit as described above.

BRIEF DESCRIPTION OF THE DRAWINGS

In order to explain technical solutions in embodiments of the present disclosure more clearly, the following will briefly introduce the drawings needed to be used in description of the embodiments. Apparently, the drawings in the following description are only some embodiments of the present disclosure. For ordinary skilled in the art, other drawings can be obtained from these drawings without paying creative effort.

REFERENCE NUMERALS

1, display panel; and 10, gate driver circuit; and

100, gate driver unit; 110, pull-down maintenance module; 111, first inverter; 112, second inverter; 113, voltage stabilization submodule; 120, pull-up module; 130, pull-up control module; 140, pull-down module; and 150, reset module.

DETAILED DESCRIPTION

Technical solutions in the embodiments of the present disclosure will be clearly and completely described with reference to the drawings. Apparently, the described embodiments are only part of the embodiments of the present disclosure, not all of them. According to the embodiments of the present disclosure, all other embodiments obtained by those skilled in the art without making creative efforts shall fall within the scope of protection of the present disclosure.

Here, it should be noted that any transistor referred in the embodiments of the present disclosure may be a thin film transistor, a field effect transistor, or other devices having the same or similar characteristics. In addition, since a source and a drain of the transistor are symmetrical, there is no difference between the source and drain. In the embodiments of the present disclosure, in order to distinguish the source and the drain of the transistor, one of the source and the drain is referred to as a first terminal, the other of the source and the drain is referred to as a second terminal, and a gate of the transistor is referred to as a control terminal. In addition, the transistors can be classified into N-type transistors and P-type transistors according to their characteristics. In the following embodiments, the N-type transistors are used for description. For example, for an N-type transistor, a first terminal of the N-type transistor is a source of the N-type transistor, a second terminal of the N-type transistor is a drain of the N-type transistor, a control terminal of the N-type transistor is a gate of the N-type transistor. The source and drain are conductive when the gate is provided with a high-level. For the P-type transistor, the opposite applies. The use of the P-type transistors is also within the scope of protection in the embodiments of the present disclosure.

Since the transistors used in the embodiments of the present disclosure are all N-type transistors, in the embodiments of the present disclosure, an operating level signal refers to a high-level signal, and a non-operating level signal refers to a low-level signal.

In addition, a material of an active layer of the transistor used in the present disclosure may be an amorphous silicon material or an oxide material, and the present disclosure is not limited herein.

Figure 1:
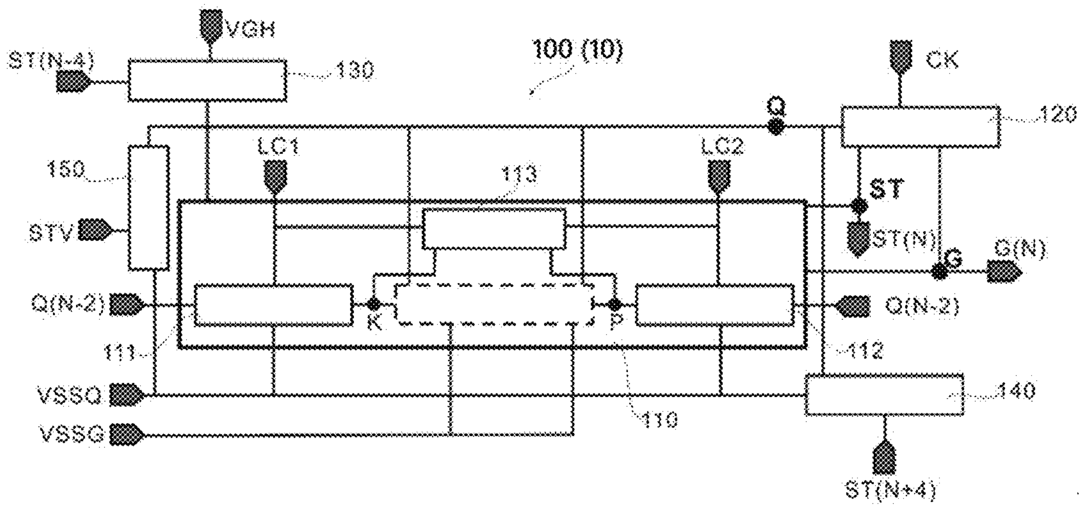
FIG. 1 is a schematic structural diagram of a gate driver unit according to some embodiments of the present disclosure.

Referring to FIG. 1, some embodiments of the present disclosure provide a gate driver circuit 10 that includes a plurality of gate driver units 100 in a cascaded configuration. Each gate driver unit 100 includes a pull-down maintenance module 110 electrically connected to a first node Q. The pull-down maintenance module 110 is configured to receive a first low-level signal VSSQ, a second low-level signal VSSG, a first control signal LC1, a second control signal LC2, and a (N−2)th stage scan signal Q(N−2), where N is an integer larger than two, and the pull-down maintenance module 110 is configured to maintain a low potential of the first node Q in response to the first low-level signal VSSQ and the second low-level signal VSSG.

Specifically, in some embodiments of the present disclosure, the pull-down maintenance module 110 includes a first inverter 111, a second inverter 112, and a voltage stabilization submodule 113. The first inverter 111 is configured to access the first control signal LC1 and includes a first inverted output terminal (namely, a node K). The second inverter 112 is configured to access the second control signal LC2 and includes a second inverted output terminal (namely, a node P). The voltage stabilization submodule 113 is electrically connected to the first inverter 111 and the second inverter 112. The voltage stabilization submodule 113 is configured to maintain a low potential of the node P in response to a high potential of the first control signal LC1 and maintain a low potential of the node K in response to a high potential of the second control signal LC2.

It should be noted that the first inverter 111 and the second inverter 112 in the pull-down maintenance module 110 are configured to operate alternately. In addition to the first inverter 111, the second inverter 112, and the voltage stabilization submodule 113, the pull-down maintenance module 110 may further include two sets of transistors for receiving the first low-level signal VSSQ and the second low-level signal VSSG, respectively, with reference to the dotted box illustrated in FIG. 1.

The working principle of the voltage stabilization submodule 113 will be described as follows. When the first control signal LC1 is at a high potential and the second control signal LC2 is at a low potential, the first inverter 111 starts to operate, and at the same time, the high potential of the first control signal LC1 causes the second control signal LC2 at a low potential to be transmitted to the node P, so that the potential of the node P is stably controlled at a low potential without being disturbed by external factors, and the potential output by the node K is not affected. Similarly, when the first control signal LC1 is at a low potential and the second control signal LC2 is at a high potential, the second inverter 112 starts to operate, and the potential of the node K is stably controlled at a low potential. This realizes stable control of the potentials of the node K and the node P in the gate driver circuit 10 of the present disclosure, and thus the stability of the output signals of the gate driver circuit 10 can be improved, and the actual lifetime of the gate driver circuit 10 is not easily deviated from the theoretical estimated value.

Figure 2:
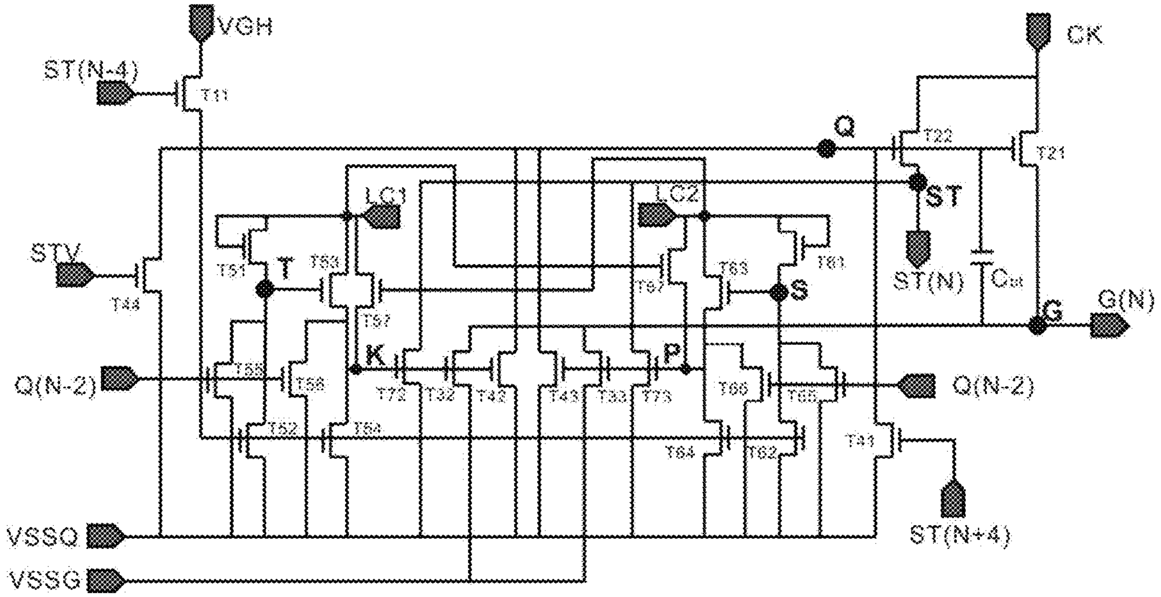
FIG. 2 is a schematic circuit diagram of the gate driver unit according to some embodiments of the present disclosure.
Figure 6:
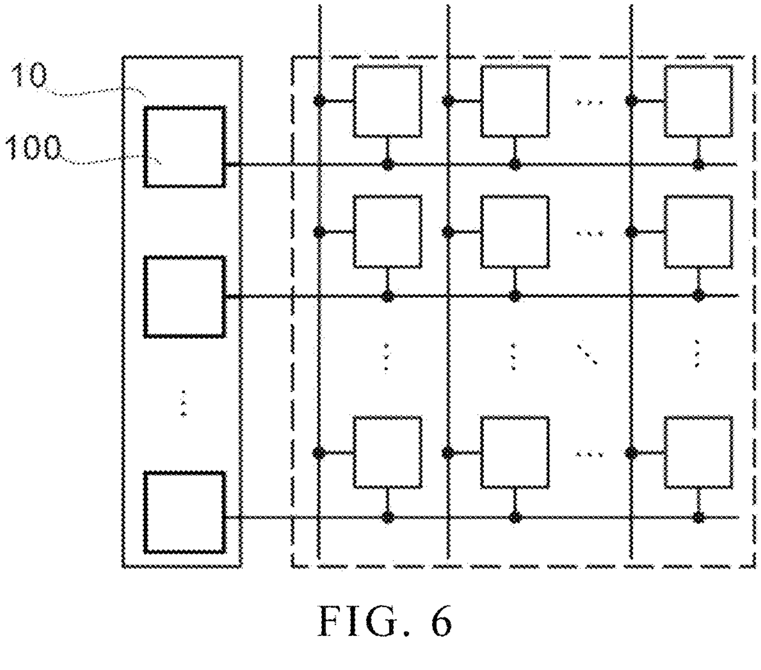
FIG. 6 is a schematic structural diagram of a display panel according to some embodiments of the present disclosure.

Referring to FIG. 2, which is a schematic circuit diagram of the gate driver unit 100 according to some embodiments of the present disclosure. In some embodiments of the present disclosure, the voltage stabilization submodule 113 includes a first voltage stabilization transistor T57 and a second voltage stabilization transistor T67. A first terminal of the first voltage stabilization transistor T57 is configured to access the first control signal LC1, a second terminal of the first voltage stabilization transistor T57 is connected to the node K, and a control terminal of the first voltage stabilization transistor T57 is configured to access the second control signal LC2. A first terminal of the second voltage stabilization transistor T67 is configured to access the second control signal LC2, a second terminal of the first voltage stabilization transistor T57 is connected to the node P, and a control terminal of the second voltage stabilization transistor T67 is configured to access the first control signal LC1. In the embodiments, when the first inverter 111 operates, the first control signal LC1 is at a high potential, the second voltage stabilization transistor T67 is turned on, and the second control signal LC2 at a low potential is output to the node P at this time, so that the potential of the node P is pulled down, and thus the potential of the node P is stably controlled at a low potential without being disturbed by external factors. Meanwhile, when the second control signal LC2 is at a low potential, the first transistor T51 is turned off, and thus the output signal of the node K is not affected. Similarly, when the second inverter 112 operates, the node K is stably controlled at a low potential. By providing the first voltage stabilization transistor T57 and the second voltage stabilization transistor T67, the embodiments of the present disclosure realize most or all functions of the voltage stabilization submodule 113, thereby maintaining the stability of the output signals of the gate driver circuit 10. At the same time, this arrangement has little influence on the overall structure of a display panel 1 (as illustrated in FIG. 6), which avoids the increasing of the width of the display panel 1. In addition, this arrangement has little change in the production process of the display panel 1, which is beneficial to reducing the production cost of the display panel 1.

As illustrated in FIG. 2, in some embodiments of the present disclosure, the first inverter 111 includes a first transistor T51, a second transistor T55, a third transistor T52, a fourth transistor T53, a fifth transistor T56, and a sixth transistor T54.

A first terminal of the first transistor T51 and a control terminal of the first transistor T51 are connected to each other and configured to access the first control signal LC1. A first terminal of the second transistor T55 is connected to a second terminal (a node T) of the first transistor T51, a second terminal of the second transistor T55 is configured to access the first low-level signal VSSQ, and a control terminal of the second transistor T55 is configured to access the (N−2)th stage scan signal Q(N−2), where N is an integer larger than two. A first terminal of the third transistor T52 is connected to the second terminal (the node T) of the first transistor T51, a second terminal of the third transistor T52 is configured to access the first low-level signal VSSQ, and a control terminal of the third transistor T52 is connected to the first node Q. A first terminal of the fourth transistor T 53 is configured to access the first control signal LC1, a second terminal of the fourth transistor T 53 is connected to the node K, and a control terminal of the fourth transistor T 53 is connected to the second terminal (the node T) of the first transistor T 51. A first terminal of the fifth transistor T56 is connected to the node K, a second terminal of the fifth transistor T56 is configured to access the first low-level signal VSSQ, and a control terminal of the fifth transistor T56 is configured to access the (N−2)th stage scan signal Q(N−2). A first terminal of the sixth transistor T54 is connected to the node K, a second terminal of the sixth transistor T54 is configured to access the first low-level signal VSSQ, and a control terminal of the sixth transistor T54 is connected to the first node Q.

It can be understood that, when the first control signal LC1 is at a high potential, the first transistor T51 is turned on, and the second terminal (the node T) of the first transistor T51 is also at a high potential, so that the fourth transistor T53 is turned on. Since the second terminal of the fourth transistor T53 is connected to the node K of the first inverter 111, the node K of the first inverter 111 will receive a high potential signal. When the first node Q is at a high potential, the third transistor T52 and the sixth transistor T54 are turned on, and the second terminal (the node T) of the first transistor T51 and the node K will receive the first low-level signal VSSQ. When the (N−2)th stage scan signal Q(N−2) is at a high potential, the second transistor T55 and the fifth transistor T56 are turned on, and the second terminal (node T) of the first transistor T51 and the node K will receive the first low-level signal VSSQ.

As illustrated in FIG. 2, in some embodiments of the present disclosure, the second inverter 112 includes a seventh transistor T61, an eighth transistor T65, a ninth transistor T62, a tenth transistor T63, an eleventh transistor T66, and a twelfth transistor T64.

A first terminal of the seventh transistor T61 and a control terminal of the seventh transistor T61 are connected to each other and configured to access the second control signal LC2. A first terminal of the eighth transistor T65 is connected to a second terminal (a node S) of the seventh transistor T61, a second terminal of the eighth transistor T65 is configured to access the first low-level signal VSSQ, and a control terminal of the eighth transistor T65 is configured to access the (N−2)th stage scan signal Q(N−2). A first terminal of the ninth transistor T62 is connected to the second terminal (the node S) of the seventh transistor T61, a second terminal of the ninth transistor T62 is configured to access the first low-level signal VSSQ, and a control terminal of the ninth transistor T62 is connected to the first node Q. A first terminal of the tenth transistor T63 is configured to access the first control signal LC1, a second terminal of the tenth transistor T63 is connected to the node P, and a control terminal of the tenth transistor T63 is connected to the second terminal (the node S) of the seventh transistor T61. A first terminal of the eleventh transistor T66 is connected to the node P, a second terminal of the eleventh transistor T66 is configured to access the first low-level signal VSSQ, and a control terminal of the eleventh transistor T66 is configured to access the (N−2)th stage scan signal Q(N−2). A first terminal of the twelfth transistor T64 is connected to the node P, a second terminal of the twelfth transistor T64 is configured to access the first low-level signal VSSQ, and a control terminal of the twelfth transistor T64 is connected to the first node Q.

It can be understood that when the second control signal LC2 is at a high potential, the seventh transistor T61 is turned on, the second terminal (the node S) of the seventh transistor T61 is also at a high potential, so that the tenth transistor T63 is turned on. Since the second terminal of the tenth transistor T63 is connected to the node P of the second inverter 112, the node P of the second inverter 112 will receive a high potential signal. When the first node Q is at a high potential, the ninth transistor T62 and the twelfth transistor T64 are turned on, and the second terminal (the node S) of the seventh transistor T61 and the node P will receive the first low-level signal VSSQ. When the (N−2)th stage scan signal Q(N−2) is at a high potential, the eighth transistor T65 and the eleventh transistor T66 are turned on, and the second terminal (the node S) of the seventh transistor T61 and the node P will receive the first low-level signal VSSQ.

In some embodiments, the pull-down maintenance module 110 further includes two sets of transistors connected to the first inverter 111 and the second inverter 112, respectively. Specifically, as illustrated in FIG. 2, in some embodiments of the present disclosure, the two sets of transistors include a thirteenth transistor T72, a fourteenth transistor T32, a fifteenth transistor T42, a sixteenth transistor T43, a seventeenth transistor T33, and an eighteenth transistor T73.

A first terminal of the thirteenth transistor T72 is connected to an Nth stage transmission signal output node ST, a second terminal of the thirteenth transistor T72 is configured to access the first low-level signal VSSQ, and a control terminal of the thirteenth transistor T72 is connected to the node K. The Nth stage transmission signal output node ST is configured to output an Nth stage transmission signal ST(N). A first terminal of the fourteenth transistor T32 is connected to a scan signal output node G, a second terminal of the thirteenth transistor T72 is connected to the second low-level signal VSSG, and a control terminal of the thirteenth transistor T72 is connected to the node K. The scan signal output node G is configured to output a Nth stage scan signal G(N). A first terminal of the fifteenth transistor T42 is connected to the first node Q, a second terminal of the fifteenth transistor T42 is configured to access the first low-level signal VSSQ, and a control terminal of the fifteenth transistor T42 is connected to the node K. A first terminal of the sixteenth transistor T43 is connected to the first node Q, a second terminal of the sixteenth transistor T43 is configured to access the first low-level signal VSSQ, and a control terminal of the sixteenth transistor T43 is connected to the node P. A first terminal of the seventeenth transistor T33 is connected to the scan signal output node G, a second terminal of the seventeenth transistor T33 is configured to access the second low-level signal VSSG, and a control terminal of the fifteenth transistor T42 is connected to the node P. A first terminal of the eighteenth transistor T73 is connected to the Nth stage transmission signal output node ST, a second terminal of the eighteenth transistor T73 is configured to access the first low-level signal VSSQ, and a control terminal of the eighteenth transistor T73 is connected to the node P.

It can be understood that, when the node K is at a high potential, the thirteenth transistor T72, the fourteenth transistor T32, and the fifteenth transistor T42 are turned on, both the first node Q and the Nth stage transmission signal output node ST access the first low-level signal VSSQ, and the scan signal output node G accesses the second low-level signal VSSG. When the node P is at a high potential, the sixteenth transistor T43, the seventeenth transistor T33, and the eighteenth transistor T73 are turned on, both the first node Q and the Nth stage transmission signal output node ST access the first low-level signal VSSQ, and the scan signal output node G accesses the second low-level signal VSSG.

It should be noted that, in the above-mentioned embodiments, the potential of the first low-level signal VSSQ is less than the potential of the second low-level signal VSSG. When the first node Q is at a high potential, the sixth transistor T54 is turned on, and the potential of the node K is equal to the potential of the first low-level signal VSSQ. Since the control terminal of the fifteenth transistor T42 is connected to the node K, and the second terminal of the fifteenth transistor T42 is configured to access the first low-level signal VSSQ, both the potential of the control terminal of the fifteenth transistor T42 and the potential of the second terminal of the fifteenth transistor T42 are equal to the potential of the first low-level signal VSSQ. Due to the absence of a voltage difference between the control terminal and the first terminal of the fifteenth transistor T42, the fifteenth transistor T42 is turned off, which can reduce or avoid the leakage of charge from the first node Q through the fifteenth transistor T42, and is beneficial to maintaining the stability of the potential of the first node Q.

As illustrated in FIG. 1, in some embodiments of the present disclosure, the gate driver unit 100 further includes a pull-up module 120, a pull-up control module 130, a pull-down module 140, and a reset module 150.

The pull-up module 120 is electrically connected to the first node Q, and the pull-up module 120 is configured to receive a clock signal CK and output the clock signal CK to the scan signal output node G in response to a high potential of the first node Q. The pull-up control module 130 is configured to transmit a constant high potential signal to the first node Q in response to an (N−4)th stage transmission signal ST(N−4), where N is an integer larger than four. The pull-down module 140 is configured to transmit the first low-level signal VSSQ to the first node Q in response to an (N+4)th stage transmission signal ST(N+4). The reset module 150 is configured to transmit the first low-level signal VSSQ to the first node Q in response to a start signal STV.

As illustrated in FIG. 2, in some embodiments of the present disclosure, the pull-up module 120 includes a pull-up transistor T21, a down-pass transistor T22, and a bootstrap capacitor $C_{br}$. A first terminal of the pull-up transistor T21 is configured to access the clock signal CK, a second terminal of the pull-up transistor T21 is connected to the scan signal output node G, and a control terminal of the pull-up transistor T21 is connected to the first node Q. A first terminal of the down-pass transistor T22 is configured to access the clock signal CK, a second terminal of the down-pass transistor T22 is connected to the Nth stage signal output node ST, and a control terminal of the down-pass transistor T22 is connected to the first node Q. A first terminal of the bootstrap capacitor $C_{bt}$ is connected to the first node Q, and a second terminal of the bootstrap capacitor $C_{bt}$ is connected to the scan signal output node G.

The pull-up control module 130 includes a pull-up control transistor T11, and a first terminal of the pull-up control transistor T11 is configured to access a constant high potential signal. In some embodiments, the constant high potential signal may be a gate turn-on voltage VGH, a second terminal of the pull-up control transistor T11 is connected to the first node Q, and a control terminal of the pull-up control transistor T11 is configured to access the (N−4)th stage transmission signal ST(N−4).

The pull-down module 140 includes a pull-down transistor T41, a first terminal of the pull-down transistor T41 is connected to the first node Q, a second terminal of the pull-down transistor T41 is configured to access the first low-level signal VSSQ, and a control terminal of the pull-down transistor T41 is configured to access the (N+4)th stage transmission signal ST(N+4).

The reset module 150 includes a reset transistor T44, a first terminal of the reset transistor T44 is connected to the first node Q, a second terminal of the reset transistor T44 is configured to access the first low-level signal VSSQ, and a control terminal of the reset transistor T44 is configured to access the start signal STV.

It should be noted that, in the above-mentioned embodiments, both the first control signal LC1 and the second control signal LC2 are low-frequency AC signals, and the potential of the high-level signal and the potential of the low-level signal are opposite. For example, both the waveform of the first control signal LC1 and the waveform of the second control signal LC2 are square waves.

Figure 3:
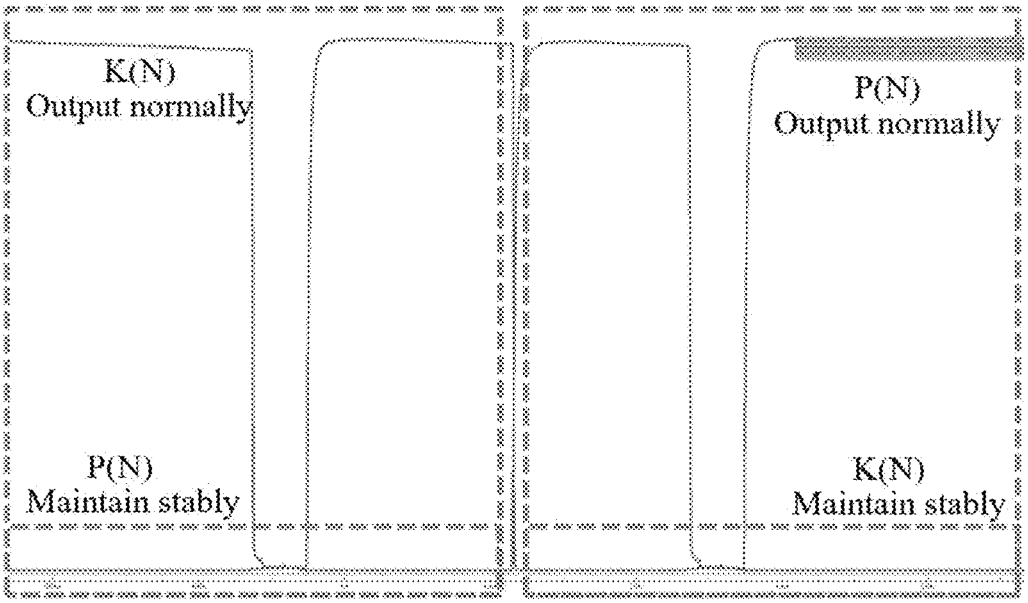
FIG. 3 is a schematic diagram illustrating changes of potentials of a node K and a node P according to some embodiments of the present disclosure.

Referring to FIG. 3, in some embodiments of the present disclosure, the voltage stabilization submodule 113 provided in the pull-down control module 110 can stabilize the potential of the node K and the potential of the node P. In FIG. 3, K(N) represents the potential of the node K, and P(N) represents the potential of the node P. As illustrated in FIG. 3, when the first inverter 111 operates, the potential K(N) of the node K has a normal change between a high potential and a low potential, and the potential P(N) of the node P is maintained at a stable low potential. When the potential P(N) of the node P is output normally, the potential K(N) of the node K can also remain stable without being disturbed by external factors.

Figure 4:
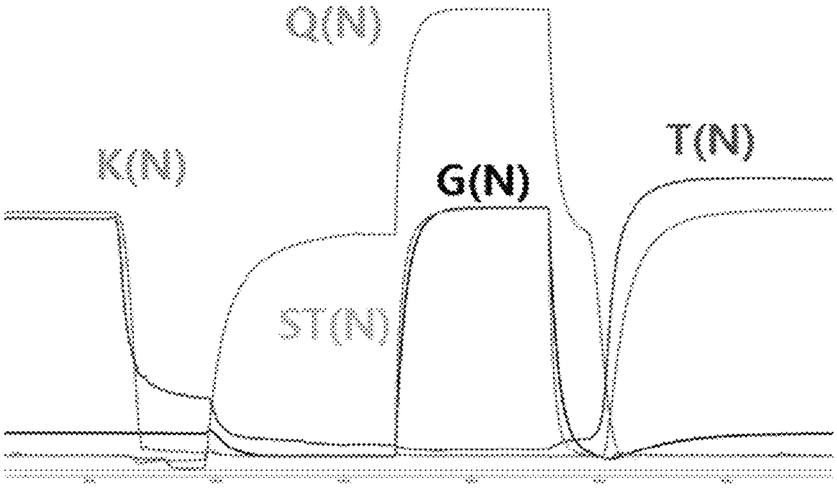
FIG. 4 is a schematic diagram illustrating changes of potentials of key nodes according to some embodiments of the present disclosure.

Referring to FIG. 4, which illustrates the waveform diagram of some nodes in the gate driver unit 100, where K(N) represents the potential of the node K, Q(N) represents the potential of the first node Q, ST(N) represents the potential of the Nth stage signal output node ST, G(N) represents the potential of the scan signal output node G, and T(N) represents the potential of the node T (the second terminal of the first transistor T51). It can be seen that the above nodes of the gate driver circuit 10 provided in the present disclosure have basic output functions and reliability.

Figure 5:
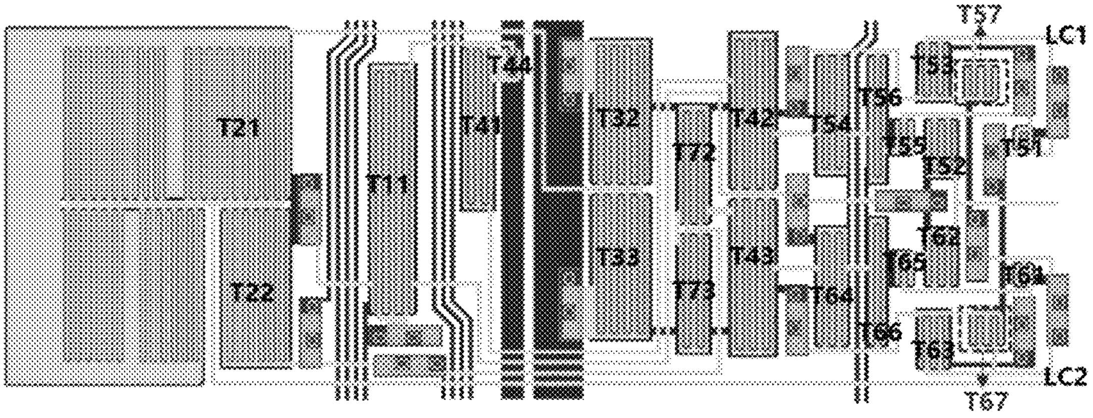
FIG. 5 is a schematic diagram of a layout of the gate driver circuit according to some embodiments of the present disclosure.

In addition, referring to FIG. 5, some embodiments of the present disclosure provide a simulated circuit layout diagram of the gate driver unit 100, in which the gate driver unit 100 has a width of 1.52.

Referring to FIG. 6, some embodiments of the present disclosure provide the display panel 1 that includes the gate driver circuit 10 as described in any of the above-mentioned embodiments. Therefore, the display panel 1 includes all the beneficial effects of the gate driver circuit 10 as described above, and will not be repeated herein.

It should be noted that, the display panel 1 may be any product or component having a display function, such as a television, a monitor, a digital photo frame, a mobile phone, or a tablet.

In the description of the present disclosure, the terms "first" and "second" are used merely for descriptive purposes and should not be construed as indicating or implying relative importance, nor as implicitly specifying the quantity of the technical features referred to. Therefore, the features defined as "first" and "second" may explicitly or implicitly include one or more features.

In the description of the present disclosure, the term "a plurality of" refers to two or more than two, unless otherwise specified.

In the above-mentioned embodiments, the description of each embodiment has its own emphasis, and for parts not described in detail in a certain embodiment, please refer to the relevant description of other embodiments.

The embodiments, examples, and related technical features of the present disclosure may be combined and replaced with each other without conflict.

The above are merely preferred embodiments of the present disclosure, and do not limit the present disclosure in any form. Any simple modifications, equivalent changes, and modifications made to the above-mentioned embodiments according to the technical essence of the present disclosure without departing from the contents of the technical solutions of the present disclosure still fall within the scope of the technical solutions of the present disclosure.

What is claimed is:

1. A gate driver circuit comprising a plurality of gate driver units in a cascaded configuration, wherein each of the gate driver units comprises:

a pull-down maintenance circuit electrically connected to a first node, wherein the pull-down maintenance circuit is configured to receive a first low-level signal, a second low-level signal, a first control signal, and a second control signal, and is configured to maintain a low potential of the first node in response to the first low-level signal and the second low-level signal, wherein the pull-down maintenance circuit comprises:

a first inverter comprising a first inverted output terminal and configured to access the first control signal;

a second inverter comprising a second inverted output terminal and configured to access the second control signal; and a voltage stabilization subcircuit electrically connected to the first inverter and the second inverter, wherein the voltage stabilization subcircuit is configured to maintain a low potential of the second inverted output terminal in response to a high potential of the first control signal, and is configured to maintain a low potential of the first inverted output terminal in response to a high potential of the second control signal;

wherein the first inverter comprises:

a first transistor, wherein a first terminal of the first transistor and a control terminal of the first transistor are connected to each other and configured to access the first control signal:

a second transistor, wherein a first terminal of the second transistor is connected to a second terminal of the first transistor, a second terminal of the second transistor is configured to access the first low-level signal, and a control terminal of the second transistor is configured to access an (N−2)th stage scan signal: wherein N is an integer larger than two:

a third transistor, wherein a first terminal of the third transistor is connected to the second terminal of the first transistor, a second terminal of the third transistor is configured to access the first low-level signal, and a control terminal of the third transistor is connected to the first node:

a fourth transistor, wherein a first terminal of the fourth transistor is configured to access the first control signal, a second terminal of the fourth transistor is connected to the first inverted output terminal, and a control terminal of the fourth transistor is connected to the second terminal of the first transistor:

a fifth transistor, wherein a first terminal of the fifth transistor is connected to the first inverted output terminal, a second terminal of the fifth transistor is configured to access the first low-level signal, and a control terminal of the fifth transistor is configured to access the (N−2)th stage scan signal; and a sixth transistor, wherein a first terminal of the sixth transistor is connected to the first inverted output terminal, a second terminal of the sixth transistor is configured to access the first low-level signal, and a control terminal of the sixth transistor is connected to the first node.

2. The gate driver circuit of claim 1, wherein the voltage stabilization subcircuit comprises:

a first voltage stabilization transistor, wherein a first terminal of the first voltage stabilization transistor is configured to access the first control signal, a second terminal of the first voltage stabilization transistor is connected to the first inverted output terminal, and a control terminal of the first voltage stabilization transistor is configured to access the second control signal; and a second voltage stabilization transistor, wherein a first terminal of the second voltage stabilization transistor is configured to access the second control signal, a second terminal of the first voltage stabilization transistor is connected to the second inverted output terminal, and a control terminal of the second voltage stabilization transistor is configured to access the first control signal.

3. The gate driver circuit of claim 1, wherein the second inverter comprises:

a seventh transistor, wherein a first terminal of the seventh transistor and a control terminal of the seventh transistor are connected to each other and configured to access the second control signal;

an eighth transistor, wherein a first terminal of the eighth transistor is connected to a second terminal of the seventh transistor, a second terminal of the eighth transistor is configured to access the first low-level signal, and a control terminal of the eighth transistor is configured to access an (N−2)th stage scan signal; wherein N is an integer larger than two;

a ninth transistor, wherein a first terminal of the ninth transistor is connected to the second terminal of the seventh transistor, a second terminal of the ninth transistor is configured to access the first low-level signal, and a control terminal of the ninth transistor is connected to the first node;

a tenth transistor, wherein a first terminal of the tenth transistor is configured to access the first control signal, a second terminal of the tenth transistor is connected to the second inverted output terminal, and a control terminal of the tenth transistor is connected to the second terminal of the seventh transistor;

an eleventh transistor, wherein a first terminal of the eleventh transistor is connected to the second inverted output terminal, a second terminal of the eleventh transistor is configured to access the first low-level signal, and a control terminal of the eleventh transistor is configured to access the (N−2)th stage scan signal; and a twelfth transistor, wherein a first terminal of the twelfth transistor is connected to the second inverted output terminal, a second terminal of the twelfth transistor is configured to access the first low-level signal, and a control terminal of the twelfth transistor is connected to the first node.

4. The gate driver circuit of claim 1, wherein the pull-down maintenance circuit further comprises:

a thirteenth transistor, wherein a first terminal of the thirteenth transistor is connected to an Nth stage transmission signal output node, a second terminal of the thirteenth transistor is configured to access the first low-level signal, and a control terminal of the thirteenth transistor is connected to the first inverted output terminal; wherein N is an integer larger than two;

a fourteenth transistor, wherein a first terminal of the fourteenth transistor is connected to a scan signal output node, a second terminal of the fourteenth transistor is configured to access the second low-level signal, and a control terminal of the fourteenth is connected to the first inverted output terminal;

a fifteenth transistor, wherein a first terminal of the fifteenth transistor is connected to the first node, a second terminal of the fifteenth transistor is configured to access the first low-level signal, and a control terminal of the fifteenth transistor is connected to the first inverted output terminal;

a sixteenth transistor, wherein a first terminal of the sixteenth transistor is connected to the first node, a second terminal of the sixteenth transistor is configured to access the first low-level signal, and a control terminal of the sixteenth transistor is connected to the second inverted output terminal;

a seventeenth transistor, wherein a first terminal of the seventeenth transistor is connected to the scan signal output node, a second terminal of the seventeenth transistor is configured to access the second low-level signal, and a control terminal of the fifteenth transistor is connected to the second inverted output terminal; and an eighteenth transistor, wherein a first terminal of the eighteenth transistor is connected to the Nth stage transmission signal output node, a second terminal of the eighteenth transistor is configured to access the first low-level signal, and a control terminal of the eighteenth transistor is connected to the second inverted output terminal.

5. The gate driver circuit of claim 1, wherein each of the gate driver units further comprises:

a pull-up circuit electrically connected to the first node, wherein the pull-up circuit is configured to receive a clock signal and output the clock signal to a scan signal output node in response to a high potential of the first node;

a pull-up control circuit configured to transmit a constant high potential signal to the first node in response to an (N−4)th stage transmission signal; wherein N is an integer larger than four;

a pull-down circuit configured to transmit the first low-level signal to the first node in response to an (N+4)th stage transmission signal; and a reset circuit configured to transmit the first low-level signal to the first node in response to a start signal.

6. The gate driver circuit of claim 5, wherein the pull-up circuit comprises:

a pull-up transistor, wherein a first terminal of the pull-up transistor is configured to access the clock signal, a second terminal of the pull-up transistor is connected to the scan signal output node, and a control terminal of the pull-up transistor is connected to the first node;

a down-pass transistor, wherein a first terminal of the down-pass transistor is configured to access the clock signal, a second terminal of the down-pass transistor is connected to an Nth stage transmission signal output node, and a control terminal of the down-pass transistor is connected to the first node; and a bootstrap capacitor, wherein a first terminal of the bootstrap capacitor is connected to the first node, and a second terminal of the bootstrap capacitor is connected to the scan signal output node.

7. The gate driver circuit of claim 5, wherein the pull-up control circuit comprises a pull-up control transistor, wherein a first terminal of the pull-up control transistor is configured to access a constant high potential signal, a second terminal of the pull-up control transistor is connected to the first node, and a control terminal of the pull-up control transistor is connected to the (N−4)th stage transmission signal.

8. The gate driver circuit of claim 5, wherein the pull-down circuit comprises a pull-down transistor, wherein a first terminal of the pull-down transistor is connected to the first node, a second terminal of the pull-down transistor is configured to access the first low-level signal, and a control terminal of the pull-down transistor is configured to access the (N+4)th stage transmission signal.

9. The gate driver circuit of claim 5, wherein the reset circuit comprises a reset transistor, wherein a first terminal of the reset transistor is connected to the first node, a second terminal of the reset transistor is configured to access the first low-level signal, and a control terminal of the reset transistor is configured to access the start signal.

10. A display panel comprising a gate driver circuit, wherein the gate driver circuit comprises a plurality of gate driver units in a cascaded configuration, and each of the gate driver units comprises:

a pull-down maintenance circuit electrically connected to a first node, wherein the pull-down maintenance circuit is configured to receive a first low-level signal, a second low-level signal, a first control signal, and a second control signal, and is configured to maintain a low potential of the first node in response to the first low-level signal and the second low-level signal, wherein the pull-down maintenance circuit comprises:

a first inverter comprising a first inverted output terminal and configured to access the first control signal;

a second inverter comprising a second inverted output terminal and configured to access the second control signal; and a voltage stabilization subcircuit electrically connected to the first inverter and the second inverter, wherein the voltage stabilization subcircuit is configured to maintain a low potential of the second inverted output terminal in response to a high potential of the first control signal, and is configured to maintain a low potential of the first inverted output terminal in response to a high potential of the second control signal, wherein the first inverter comprises:

a first transistor, wherein a first terminal of the first transistor and a control terminal of the first transistor are connected to each other and configured to access the first control signal;

a second transistor, wherein a first terminal of the second transistor is connected to a second terminal of the first transistor, a second terminal of the second transistor is configured to access the first low-level signal, and a control terminal of the second transistor is configured to access an (N−2)th stage scan signal; wherein N is an integer larger than two;

a third transistor, wherein a first terminal of the third transistor is connected to the second terminal of the first transistor, a second terminal of the third transistor is configured to access the first low-level signal, and a control terminal of the third transistor is connected to the first node;

a fourth transistor, wherein a first terminal of the fourth transistor is configured to access the first control signal, a second terminal of the fourth transistor is connected to the first inverted output terminal, and a control terminal of the fourth transistor is connected to the second terminal of the first transistor;

a fifth transistor, wherein a first terminal of the fifth transistor is connected to the first inverted output terminal, a second terminal of the fifth transistor is configured to access the first low-level signal, and a control terminal of the fifth transistor is configured to access the (N−2)th stage scan signal; and a sixth transistor, wherein a first terminal of the sixth transistor is connected to the first inverted output terminal, a second terminal of the sixth transistor is configured to access the first low-level signal, and a control terminal of the sixth transistor is connected to the first node.

11. The display panel of claim 10, wherein the voltage stabilization subcircuit comprises:

a first voltage stabilization transistor, wherein a first terminal of the first voltage stabilization transistor is configured to access the first control signal, a second terminal of the first voltage stabilization transistor is connected to the first inverted output terminal, and a control terminal of the first voltage stabilization transistor is configured to access the second control signal; and a second voltage stabilization transistor, wherein a first terminal of the second voltage stabilization transistor is configured to access the second control signal, a second terminal of the first voltage stabilization transistor is connected to the second inverted output terminal, and a control terminal of the second voltage stabilization transistor is configured to access the first control signal.

12. The display panel of claim 10, wherein the second inverter comprises:

a seventh transistor, wherein a first terminal of the seventh transistor and a control terminal of the seventh transistor are connected to each other and configured to access the second control signal;

an eighth transistor, wherein a first terminal of the eighth transistor is connected to a second terminal of the seventh transistor, a second terminal of the eighth transistor is configured to access the first low-level signal, and a control terminal of the eighth transistor is configured to access an (N−2)th stage scan signal; wherein N is an integer larger than two;

a ninth transistor, wherein a first terminal of the ninth transistor is connected to the second terminal of the seventh transistor, a second terminal of the ninth transistor is configured to access the first low-level signal, and a control terminal of the ninth transistor is connected to the first node;

a tenth transistor, wherein a first terminal of the tenth transistor is configured to access the first control signal, a second terminal of the tenth transistor is connected to the second inverted output terminal, and a control terminal of the tenth transistor is connected to the second terminal of the seventh transistor;

an eleventh transistor, wherein a first terminal of the eleventh transistor is connected to the second inverted output terminal, a second terminal of the eleventh transistor is configured to access the first low-level signal, and a control terminal of the eleventh transistor is configured to access the (N−2)th stage scan signal; and a twelfth transistor, wherein a first terminal of the twelfth transistor is connected to the second inverted output terminal, a second terminal of the twelfth transistor is configured to access the first low-level signal, and a control terminal of the twelfth transistor is connected to the first node.

13. The display panel of claim 10, wherein the pull-down maintenance circuit further comprises:

a thirteenth transistor, wherein a first terminal of the thirteenth transistor is connected to an Nth stage transmission signal output node, a second terminal of the thirteenth transistor is configured to access the first low-level signal, and a control terminal of the thirteenth transistor is connected to the first inverted output terminal; wherein N is an integer larger than two;

a fourteenth transistor, wherein a first terminal of the fourteenth transistor is connected to a scan signal output node, a second terminal of the fourteenth transistor is configured to access the second low-level signal, and a control terminal of the fourteenth transistor is connected to the first inverted output terminal;

a fifteenth transistor, wherein a first terminal of the fifteenth transistor is connected to the first node, a second terminal of the fifteenth transistor is configured to access the first low-level signal, and a control terminal of the fifteenth seventeenth transistor is connected to the first inverted output terminal;

a sixteenth transistor, wherein a first terminal of the sixteenth transistor is connected to the first node, a second terminal of the sixteenth transistor is configured to access the first low-level signal, and a control terminal of the sixteenth transistor is connected to the second inverted output terminal;

a seventeenth transistor, wherein a first terminal of the seventeenth transistor is connected to the scan signal output node, a second terminal of the seventeenth transistor is configured to access the second low-level signal, and a control terminal of the seventeenth transistor is connected to the second inverted output terminal; and an eighteenth transistor, wherein a first terminal of the eighteenth transistor is connected to the Nth stage transmission signal output node, a second terminal of the eighteenth transistor is configured to access the first low-level signal, and a control terminal of the eighteenth transistor is connected to the second inverted output terminal.

14. The display device of claim 10, wherein each of the gate driver units further comprises:

a pull-up circuit electrically connected to the first node, wherein the pull-up circuit is configured to receive a clock signal and output the clock signal to a scan signal output node in response to a high potential of the first node;

a pull-up control circuit configured to transmit a constant high potential signal to the first node in response to an (N−4)th stage transmission signal; wherein N is an integer larger than four;

a pull-down circuit configured to transmit the first low-level signal to the first node in response to an (N+4)th stage transmission signal; and a reset circuit configured to transmit the first low-level signal to the first node in response to a start signal.

15. The display panel of claim 14, wherein the pull-up circuit comprises:

a pull-up transistor, wherein a first terminal of the pull-up transistor is configured to access the clock signal, a second terminal of the pull-up transistor is connected to the scan signal output node, and a control terminal of the pull-up transistor is connected to the first node;

a down-pass transistor, wherein a first terminal of the down-pass transistor is configured to access the clock signal, a second terminal of the down-pass transistor is connected to an Nth stage transmission signal output node, and a control terminal of the down-pass transistor is connected to the first node; and a bootstrap capacitor, wherein a first terminal of the bootstrap capacitor is connected to the first node, and a second terminal of the bootstrap capacitor is connected to the scan signal output node.

16. The display panel of claim 14, wherein the pull-up control circuit comprises a pull-up control transistor, wherein a first terminal of the pull-up control transistor is configured to access a constant high potential signal, a second terminal of the pull-up control transistor is connected to the first node, and a control terminal of the pull-up control transistor is connected to the (N−4)th stage transmission signal.

17. The display panel of claim 14, wherein the pull-down circuit comprises a pull-down transistor, wherein a first terminal of the pull-down transistor is connected to the first node, a second terminal of the pull-down transistor is configured to access the first low-level signal, and a control terminal of the pull-down transistor is configured to access the (N+4)th stage transmission signal.

18. The display panel of claim 14, wherein the reset circuit comprises a reset transistor, wherein a first terminal of the reset transistor is connected to the first node, a second terminal of the reset transistor is configured to access the first low-level signal, and a control terminal of the reset transistor is configured to access the start signal.

19. A gate driver circuit comprising a plurality of gate driver units in a cascaded configuration, wherein each of the gate driver units comprises:

a pull-down maintenance circuit electrically connected to a first node, wherein the pull-down maintenance circuit is configured to receive a first low-level signal, a second low-level signal, a first control signal, and a second control signal, and is configured to maintain a low potential of the first node in response to the first low-level signal and the second low-level signal, wherein the pull-down maintenance circuit comprises:

a first inverter comprising a first inverted output terminal and configured to access the first control signal;

a second inverter comprising a second inverted output terminal and configured to access the second control signal; and a voltage stabilization subcircuit electrically connected to the first inverter and the second inverter, wherein the voltage stabilization subcircuit is configured to maintain a low potential of the second inverted output terminal in response to a high potential of the first control signal, and is configured to maintain a low potential of the first inverted output terminal in response to a high potential of the second control signal;

wherein the pull-down maintenance circuit further comprises:

a first transistor, wherein a first terminal of the first transistor is connected to an Nth stage transmission signal output node, a second terminal of the first transistor is configured to access the first low-level signal, and a control terminal of the first transistor is connected to the first inverted output terminal; wherein N is an integer larger than two;

a second transistor, wherein a first terminal of the second transistor is connected to a scan signal output node, a second terminal of the second transistor is configured to access the second low-level signal, and a control terminal of the second transistor is connected to the first inverted output terminal;

a third transistor, wherein a first terminal of the third transistor is connected to the first node, a second terminal of the third transistor is configured to access the first low-level signal, and a control terminal of the third transistor is connected to the first inverted output terminal;

a fourth transistor, wherein a first terminal of the fourth transistor is connected to the first node, a second terminal of the fourth transistor is configured to access the first low-level signal, and a control terminal of the fourth transistor is connected to the second inverted output terminal;

a fifth transistor, wherein a first terminal of the fifth transistor is connected to the scan signal output node, a second terminal of the fifth transistor is configured to access the second low-level signal, and a control terminal of the fifth transistor is connected to the second inverted output terminal; and a six transistor, wherein a first terminal of the six transistor is connected to the Nth stage transmission signal output node, a second terminal of the six transistor is configured to access the first low-level signal, and a control terminal of the six transistor is connected to the second inverted output terminal.

20. The gate driver circuit of claim 19, wherein the first inverter comprises:

a seventh transistor, wherein a first terminal of the seventh transistor and a control terminal of the seventh transistor are connected to each other and configured to access the first control signal;

an eighth transistor, wherein a first terminal of the eighth transistor is connected to a second terminal of the seventh transistor, a second terminal of the eighth transistor is configured to access the first low-level signal, and a control terminal of the eighth transistor is configured to access an (N−2)th stage scan signal; wherein N is an integer larger than two;

a ninth transistor, wherein a first terminal of the ninth transistor is connected to the second terminal of the seventh transistor, a second terminal of the ninth transistor is configured to access the first low-level signal, and a control terminal of the ninth transistor is connected to the first node;

a tenth transistor, wherein a first terminal of the tenth transistor is configured to access the first control signal, a second terminal of the tenth transistor is connected to the first inverted output terminal, and a control terminal of the tenth transistor is connected to the second terminal of the seventh transistor;

an eleventh transistor, wherein a first terminal of the eleventh transistor is connected to the first inverted output terminal, a second terminal of the eleventh transistor is configured to access the first low-level signal, and a control terminal of the eleventh transistor is configured to access the (N−2)th stage scan signal; and a twelfth transistor, wherein a first terminal of the twelfth transistor is connected to the first inverted output terminal, a second terminal of the twelfth transistor is configured to access the first low-level signal, and a control terminal of the twelfth transistor is connected to the first node;

wherein the second inverter comprises:

a thirteenth transistor, wherein a first terminal of the thirteenth transistor and a control terminal of the thirteenth transistor are connected to each other and configured to access the second control signal;

a fourteenth transistor, wherein a first terminal of the fourteenth transistor is connected to a second terminal of the thirteenth transistor, a second terminal of the fourteenth transistor is configured to access the first low-level signal, and a control terminal of the fourteenth transistor is configured to access an (N−2)th stage scan signal; wherein N is an integer larger than two;

a fifteenth transistor, wherein a first terminal of the fifteenth transistor is connected to the second terminal of the thirteenth transistor, a second terminal of the fifteenth transistor is configured to access the first low-level signal, and a control terminal of the fifteenth transistor is connected to the first node;

a sixteenth transistor, wherein a first terminal of the sixteenth transistor is configured to access the first control signal, a second terminal of the sixteenth transistor is connected to the second inverted output terminal, and a control terminal of the sixteenth transistor is connected to the second terminal of the thirteenth transistor;

a seventeenth transistor, wherein a first terminal of the seventeenth transistor is connected to the second inverted output terminal, a second terminal of the seventeenth transistor is configured to access the first low-level signal, and a control terminal of the seventeenth transistor is configured to access the (N−2)th stage scan signal; and an eighteenth transistor, wherein a first terminal of the eighteenth transistor is connected to the second inverted output terminal, a second terminal of the eighteenth transistor is configured to access the first low-level signal, and a control terminal of the eighteenth transistor is connected to the first node.

* * * * *